Sept. 8, 1964 J. WINSON 3,147,493
ELECTRONICALLY HEAT SEALED HAND COVERING
Filed Dec. 12, 1962 4 Sheets-Sheet 1
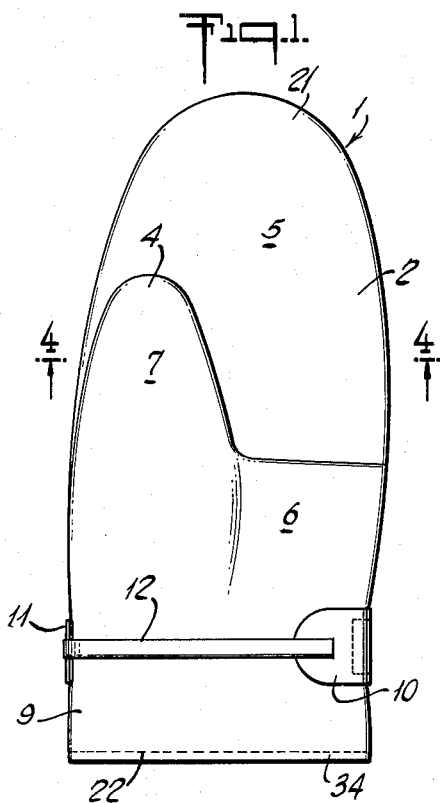
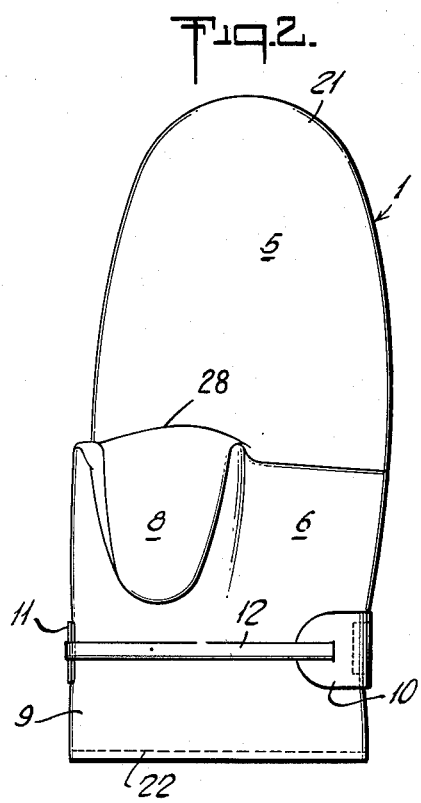
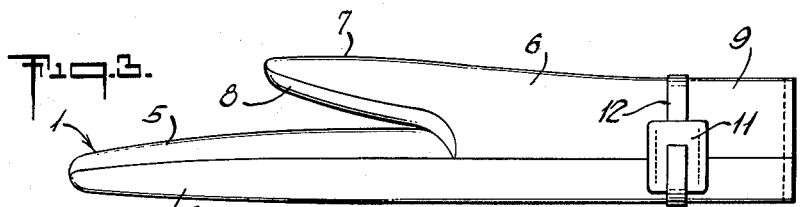
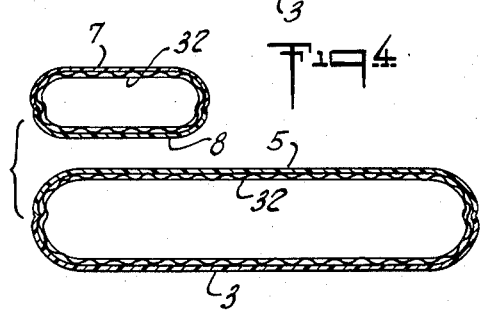
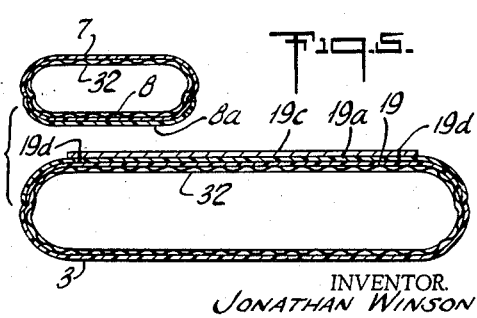
INVENTOR.
JONATHAN WINSON
BY Edward V. Connors
ATTORNEY

INVENTOR.
JONATHAN WINSON

BY Edward F. Connors

ATTORNEY

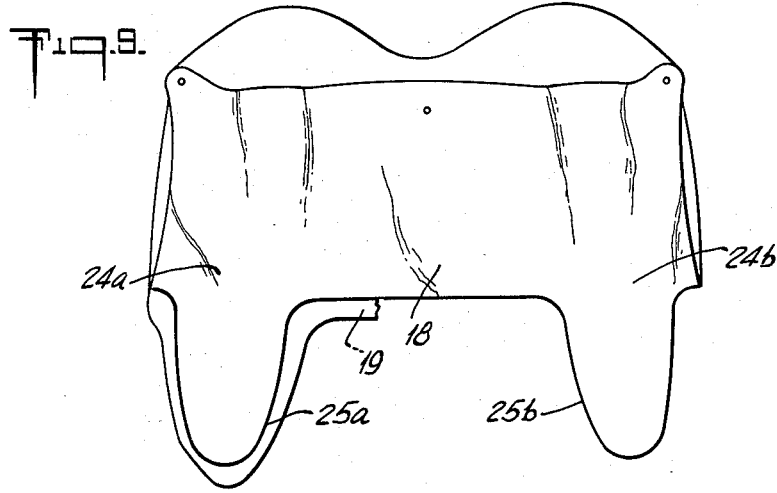
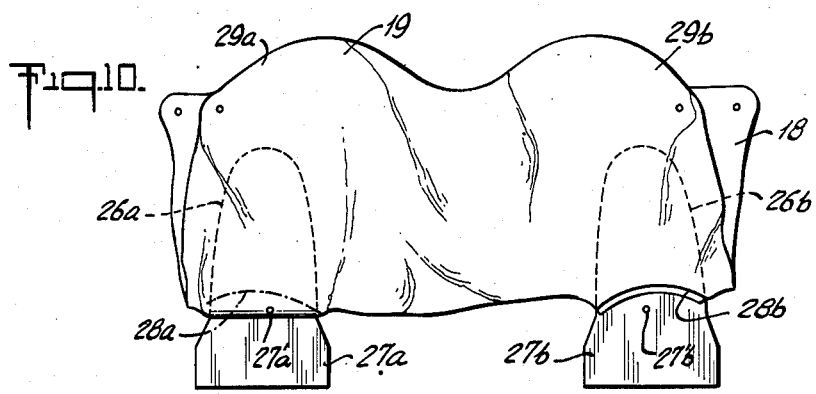
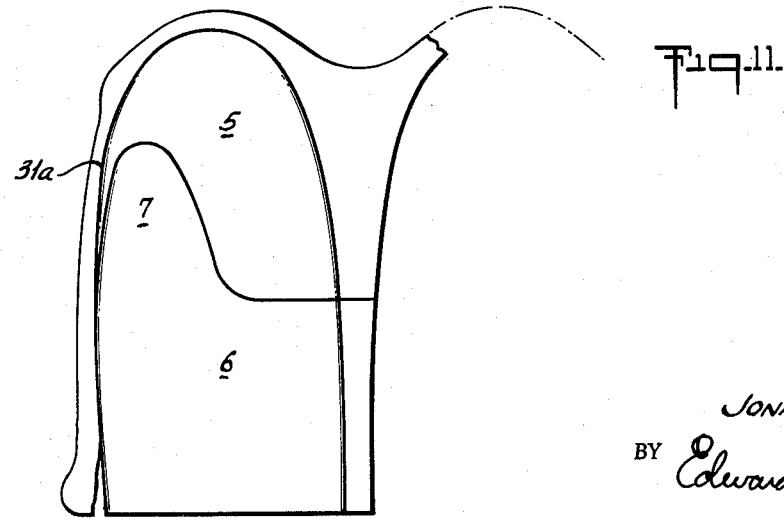

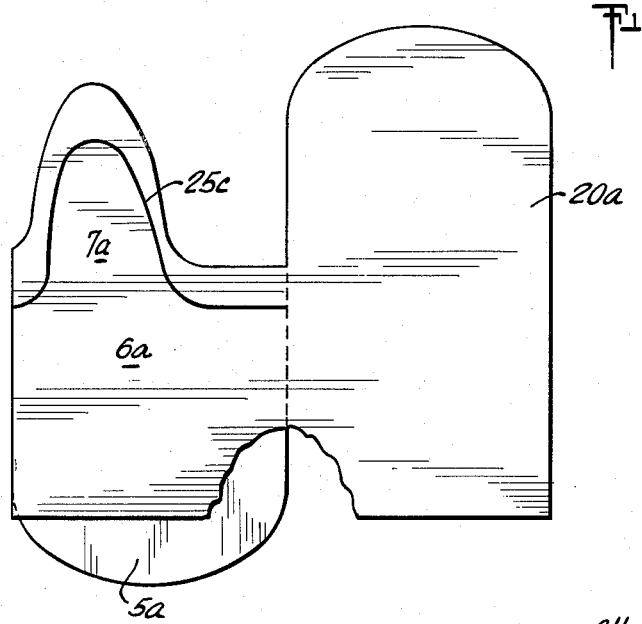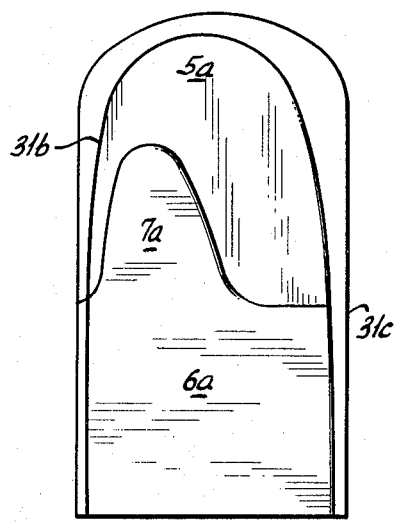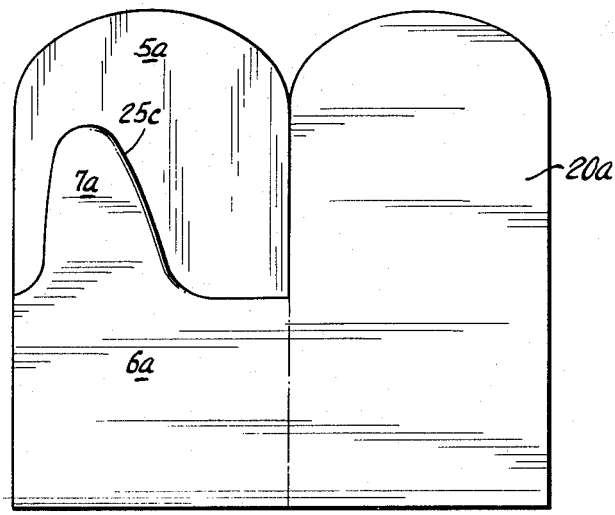

United States Patent Office 3,147,493
Patented Sept. 8, 1964

3,147,493
ELECTRONICALLY HEAT SEALED HAND
COVERING
Jonathan Winson, 793 East Drive, Oradell, N.J.
Filed Dec. 12, 1962, Ser. No. 244,098
7 Claims. (Cl. 2—158)

The present invention relates to hand coverings such as gloves and mittens and particularly to those made from thermoplastic sheeting and generally, though not necessarily, used with an insulating liner.

The preferred embodiment of my invention is best exemplified by a description of its use in the fabrication of a mitten. However, the basic construction as taught in the fabrication of a mitten may be modified to form a glove as will be hereinafter explained.

The hand coverings in accordance with the invention may have a separate corresponding insulating liner to provide the desired warmth to the wearer.

The outer covering of the mitten is made from thermoplastic sheeting which is fabricated by heat sealing to form the covering. A vinyl chloride polymer plasticized sheeting properly formulated for low temperature flexibility is particularly suitable, but other heat sealable materials may be used.

Among suitable materials are the already mentioned vinyl chloride polymer plasticized sheeting, polyethylene sheeting, nylon, or impregnations of these basic materials into fabrics, woven materials of the same materials, and any other material which may be heat sealed to provide the means for fabricating the materials into the hand coverings. The term "thermoplastic" has been used generically to designate a suitable sheeting material which readily may be heat sealed using electronic heat sealing apparatus. The thermoplastic materials are advantageous in providing a low cost hand covering.

At least a portion of the outer covering may be made from "Poron" manufactured by the Rogers Corporation of Rogers, Connecticut. "Poron" is a micro-porous polyvinylchloride sheeting. The micro-porosity allows for the passage of water vapor and air while maintaining resistance to the passage of ordinary water. The material is such that under normal use including immersing in water, the mitten maintains its waterproofness. The material will withstand water under approximately a head of 50 cm. of water and by certain industry standards is termed waterproof. However, moisture tends to pass outwardly through the material. Thus it "breathes" out the moisture produced by normal perspiration and a hand covering made therefrom does not have the inside condensation such as is experienced when wearing a hand covering made from rubber or from the thermoplastic sheeting generally available.

The vinyl sheeting may be produced in practically any color and its surface may be embossed to simulate other materials or embossed with new and unusual designs. Vinyl sheeting is a solid material as distinguished from other materials generally used for handwear such as cloth or leather which are inherently porous materials. The vinyl sheeting has resiliency and the solid structure has a modulus of elasticity such that the flat sheeting when bent tends to spring back into a flat shape.

This characteristic presents difficulties in the fabrication of an attractive hand covering as the material does not readily conform to a three dimensional shape as do the conventional materials such as leather or fabric. In order to produce a low cost item, labor costs must be kept at a minimum. This is achieved by fabricating the hand covering from thermoplastic sheeting by "electronic" heat sealing of the type using a die electrode rather than by heat sealing of the type using electrodes making a progressive seal analogous to the stitching operation performed by a sewing machine.

In the die and press electronic seal the entire seal must be made at one time using an electrode shaped to correspond with the shape of the desired seal. This operation requires the material to be practically flat and unstressed while the sealing operation is taking place. Accordingly, entirely new constructions and fabricating methods must be devised to practice the die and press electronic seal. However, it is quite obvious that the die and press method is extremely rapid and is thus suitable for mass production.

The waterproof hand coverings in accordance with the invention are particularly designed for use by children and thus the low cost thereof is an important feature. To a lesser extent, the hand coverings are manufactured for use by adults.

A study of the patented art will reveal that prior to my work in this field there has been no practical article of this nature sold in the mass market. The first patent showing a hand covering made of thermoplastic sheeting for wear as protection against weather is my Patent No. 2,737,662, issued March 13, 1956, which shows means for attaching a mitten liner to a thermoplastic covering. My Patent No. 2,782,421, issued February 26, 1957, is directed to a thermoplastic mitten including an improved fingertip construction. On October 15, 1957, my Patents No. 2,809,376 and No. 2,809,377 were issued. Patent No. 2,809,376 is directed to the method of manufacture of a one piece mitten. Thereafter, on May 9, 1959, my Patent No. 2,884,643 was issued directed to an improvement for elastically shirring the wrist portion of the mitten. On February 7, 1961, my Patent No. 2,970,317 was issued directed to a Glove and Method of Manufacture Thereof.

As an example of the mass market in thermoplastic hand coverings, it may be noted that almost five million pairs have been made under my above listed patents to the present time.

The present invention aims to provide a construction and method of fabrication of a hand covering which utilizes the die and press method of electronic heat sealing to provide a hand covering from flat sheeting yet which has the required three dimensional side walls and is attractive in appearance.

Another object of the invention is to provide a hand covering which is simple and economical in manufacture, attractive in appearance, and rugged in wear.

In accordance with the invention this is accomplished by fabricating a hand covering which basically is made from three cuttings or blanks, an inner thumb and front finger blank, an outer thumb and front wrist blank, and a back blank, the parts being electronically heat sealed together while maintained in position, a complete pair of hand coverings being made at one time. However, in making a single hand covering at one time, the back blanks may be integral with the outer thumb and front wrist blank and folded into position for the edge seal. In some cases the sealed assembly is thereafter reversed to form to finished hand covering. A method of fabrication is used in which the front surface of the hand covering is made which is then heat sealed to the rear surface. If desired, a heat sealed plait may be made in the crotch between the thumb and finger portion so as to enhance the appearance and fit of the hand covering. If desired, leather or other reenforcing material may be attached to the blanks by sewing or other suitable means before the usual assembly and sealing operations.

The present construction teaches the use of a thumb construction which is somewhat more economical to fabricate than the thumb construction shown in my Patents 2,782,421 and 2,809,377, and permits the use of a thicker sheet material than the thumb construction described in my Patent 2,809,376.

Other objects and advantages of the invention will be apparent from the following description and from the accompanying drawings which show, by way of example, embodiments of the invention.

In the drawings:

FIGURE 1 is a top view of a hand covering, such as a mitten, made in accordance with the invention.

FIGURE 2 is a view corresponding to FIGURE 1 with the thumb turned downwardly so as to show the crotch seal.

FIGURE 3 is a side view of the mitten shown in FIGURE 1.

FIGURE 4 is a sectional view taken along the lines 4—4 of FIGURE 1.

FIGURE 5 is a sectional view corresponding to FIGURE 4 of a somewhat modified form of construction.

FIGURE 9 is a partial assembly of a pair of hand coverings showing the front wrist and outer thumb portion in position over the front finger blank, a seal having been made along the sides and over the end of the thumbs of the hand covering.

FIGURE 10 shows the assembly of FIGURE 9 with the thumbs turned inside out and positioned between the blanks. The lefthand portion of the assembly is shown as ready to be sealed while the righthand portion is shown as sealed with the surplus material stripped away.

FIGURE 11 shows left hand side of the assemby of FIGURE 10 after the thumb has been reversed, the assembly having been placed over the back blank and an edge heat seal having been made. The hand covering corresponding to the righthand side of the blank has been stripped away.

FIGURE 12 shows a somewhat modified form of construction in which the back blank is made integral with the front wrist portion, the front finger portion being attached to the front wrist portion by a heat seal.

FIGURE 13 is a view corresponding to FIGURE 12 but with the front finger portion turned up into position ready for the final seal.

FIGURE 14 shows the assembly of FIGURE 13 after the final seal has been made.

Figure 6:
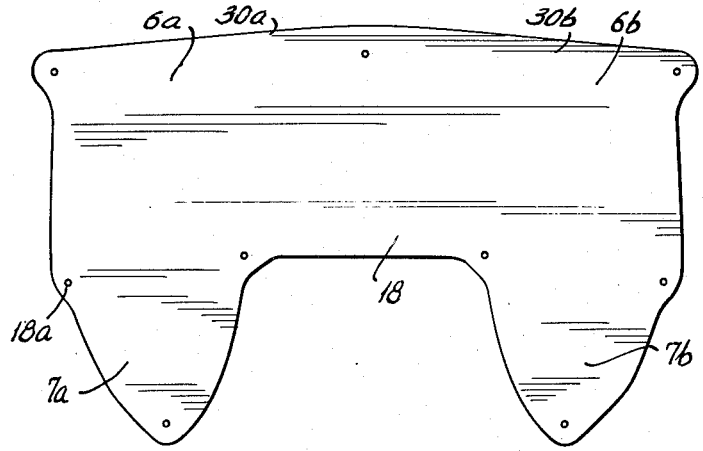
FIGURES 6, 7 and 8 illustrate blanks used in the assembly of a pair of the hand coverings shown in FIGURE 1.

Referring to the drawings there is shown a hand covering or mitten 1 in accordance with the invention and including a palm side 2, a rear side 3, a thumb side 4, the palm side 3 being divided into a front finger portion 5 and a front wrist portion 6. The thumb 4 includes an outer side 7 and an inner side 8. The wrist portion 9 may be provided with closure means including restraining loops 10 and 11 to receive a pull string 12, or the wrist portion may be tightened by any other conventional closure means, or the closure means may be omitted. Alternatively, a shirred elastic assembly may be used as described in my Patent 2,884,643.

Figure 7:
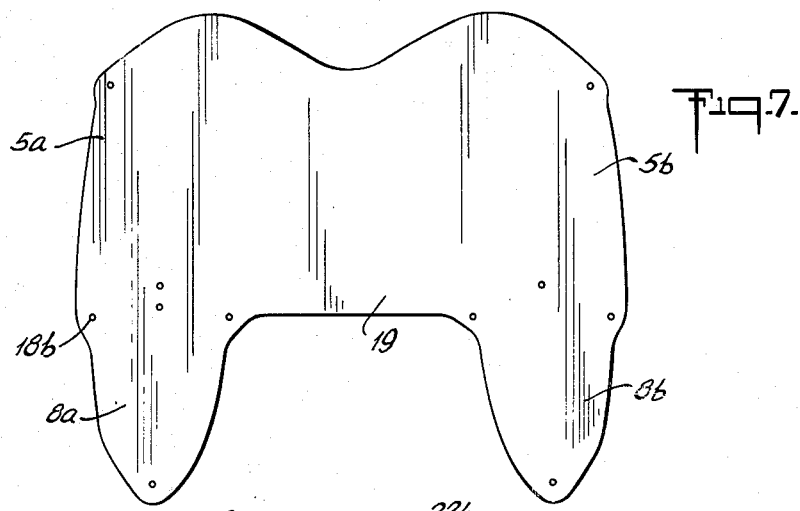
Figure 8:
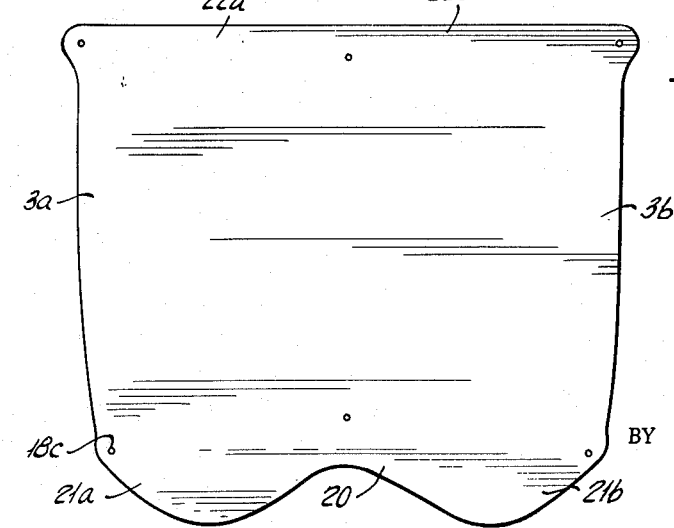

The hand covering or mitten 1 may be made from panels or blanks which are precut as shown in FIGURES 6, 7 and 8. In FIGURE 6 there is shown a panel 18 forming outer thumb portions 7a and 7b and wrist portions 6a and 6b. In FIGURE 7 there is shown a panel 19 forming inner thumb portions 8a and 8b and finger tip and palm portions 5a and 5b. In FIGURE 8 there is shown a panel 20 forming rear sides 3a and 3b. The panels 3a and 3b extend from the fingertip portion 21 to the wrist end 22. All of the panels 18, 19 and 20 are provided with a plurality of openings 18a, 18b and 18c so as to mount the panels over pins extending from a worktable.

The first step in fabricating the hand covering 1 in accordance with the invention is shown in FIGURE 9. The panel 19 is placed over pins on a worktable with its outer surface facing upwardly. The panel 18 is placed over the panel 19 with its outer surface facing downwardly so that the outer faces of the panels 18 and 19 are in juxtaposition. It should be noted that by means of the position of openings 18a, and because of the greater width of the portions 7a and 7b of the panel 18, there is an upwardly directed fullness in portions 24a and 24b. A tear-type heat seal is made as indicated at 25a outwardly of the thumb portion 7a and extending along the periphery of the thumb portion 7b as indicated at 25b. The surplus material outwardly of the heat seal 25b has been torn away. Before the next operation the remaining surplus edge is to be torn away from the heat seal 25a.

In the next operation, shown in FIGURE 10, the assembly of FIGURE 9 is removed from the pins and the thumb portions 7a and 7b are reversed and the assembly folded so that the reversed thumb is positioned between the front and rear surfaces, the position of the thumb being indicated by the dotted lines 26a and 26b in FIGURE 9. Cantilever type electrodes 27a and 27b are inserted in the thumbs and tear-type heat seals are made as indicated at 28a and 28b to form plaits. As shown in FIGURE 10, the left hand portion of the assembly is ready for heat sealing while the right hand portion has been sealed and the surplus material has been torn away. The purpose of seals 28a and 28b is to provide an improved fit at the crotch between the thumb and the finger portion of the hand covering. It should be noted that the seals 28a and 28b are arcuate in shape. In some constructions to reduce the cost this operation may be omitted.

Upon completing the assembly shown in FIGURE 10 the thumbs are reversed to their original position. The panel 20 is placed in position on the worktable with its ends 21a and 21b in the direction of the fingertip end of the hand covering 1. The assembly as described in connection with FIGURE 10 is opened up so that fingertip ends 29a and 29b are positioned over ends 21a and 21b and ends 30a and 30b (FIGURE 6) are placed over ends 22a and 22b (FIGURE 8) of the panel 20. The assembly is then as shown in FIGURE 10 after tear-type heat seals 31a have been made. The right hand mitten has been shown as torn away along the outer surface of its heat seal. The assemblies of FIGURE 11 may then be reversed and form the outer coverings for the hand covering 1, although, as stated previously, the mitten may be used as now fabricated if desired. A suitable insulating lining 32 (FIGURE 4) may be inserted and secured in place by stitching 34 along the wrist edge 9. The insulating lining may be secured in position by friction, or as described in my aforesaid patents numbered 2,737,662 or 2,782,421. At the same time the restraining loops 10 and 11 may be placed in position completing the assembly of the hand covering 1.

In some constructions it may be deemed advisable to attach a reenforcing surface such as leather to the finger portion of the hand covering. In such cases the blank 19 may be doubled, that is, made of one sheet of thermoplastic material 19 and a second sheet 19a with a leather reenforcing pad 19c sewn in position. The fabrication of the hand covering is then completed as described above, the double sheets 19 and 19a forming a double surface for the front side of the finger portion. The outer sheet may be perforated so as to attach the reenforcing pad 19c and the inner portion unperforated thereby retaining the waterproof characteristics of the hand covering. A cross sectional view of this construction is shown in FIGURE 5 wherein the leather pad 19c is attached by sewing 19d to a blank 19a superposed on the blank 19 of the embodiment previously described. Any moisture which may enter through the perforations made for the sewing 19d is prevented from entering the interior of the mitten as blank 19 is unperforated.

In FIGURES 12 through 14 there is shown a somewhat modified form of construction, in which a single hand covering is made at a time, in which case, it may be desirable to form the front wrist portion 6a and the back portion 20a as a single blank. The front finger portion blank 5a is placed under blank 6a and a heat seal made as indicated at 25c. If desired, a crotch seal may be made as described for the previous embodiment, although in some cases this seal may be dispensed with. The front finger portion 5a is then swung upwardly into the position shown in FIGURE 13. The back blank 20a may then be swung under the parts 5a and 6a and a heat seal 31b made as shown in FIGURE 14, thereby completing the assembly of the mitten which as in the case of the previously described embodiment may be used in either the reversed or unreversed condition.

In some cases, in the construction shown in FIGURES 12 through 14, it may be desirable from the appearance standpoint to continue the seal 31b inwardly of the fold 31c. However this extension of the heat seal 31b may be omitted if desired.

While the invention has been described and illustrated with reference to its embodiment in a mitten, the construction might also be involved in a glove as described in my aforementioned Patent 2,970,317. In such case, the front portion of the present construction would be made up as described herein and placed over the back section. However, before the sealing operation is performed, a fourchette assembly as described in my Patent 2,970,317 is interposed between the front and rear sections. An edge seal is made as described herein with a die modified in accordance with the teaching of Patent 2,970,317 so as to simultaneously separate the fingers of the glove and secure the fourchettes in position. Likewise, the reenforcing leather pad may be attached to the outer surface of the finger portion of the gloves in the same manner as described for use on the finger portion of the mitten.

It will thus be seen that a hand covering has been described and illustrated which may have either a single or double palm sheet, one underlying the other. In the manufacture of the mitten, the blanks forming the two palm sheets are superimposed one over the other and held together by the first heat seal. Thereafter, the assembly proceeds as though only a single palm sheet were used and in the final seal the two palm sheets are secured together similarly as is the case when a single palm sheet is used.

As previously stated although a crotch seal has been described it need not be used in all cases although generally desirable from the standpoint of enhancing the appearance of the hand covering and providing a better fit. While the hand covering may be reversed after fabrication in a preferred construction, it need not be reversed for some applications. A somewhat more finished appearance of the heat seal results from the reversed construction. Further, for any of the embodiments, a pair of hand coverings may be made at one time in which case there are used three blanks, namely a front finger and inside thumb blank, an outside thumb and front wrist blank, and a back blank. In this case a complete pair of mittens may be made at one time. In the event a single hand covering is to be made at one time, a single sheet is folded over so as to form both the back and the front wrist and outside thumb portion, another blank being used for the inside thumb and front finger portion.

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

I claim:

1. An electronically heat sealed hand covering made from thermoplastic sheeting, the finished glove having inner and outer surfaces and having a thumb and including palm and rear sides and having a fingertip portion, a thumb crotch being formed between the thumb and the palm side, the palm side including a front finger portion and a front wrist portion joined by a substantially continuous heat seal extending transversally therecross and extending along the sides and top end of the thumb, the transverse portion of the seal being approximately at the save level as the thumb crotch, said heat seal positioned on the inner surface of the palm side, and a back portion joined to the palm side by a heat seal extending at least along one side and across the finger tip portion.

2. An electronically heat sealed hand covering made from thermoplastic sheeting, the finished glove having inner and outer surfaces and having a thumb and including palm and rear sides and a finger tip portion, a thumb crotch being formed between the thumb and the palm side, the palm side including a front finger portion and a front wrist portion joined by a substantially continuous heat seal extending transversally therecross and extending along the sides and top end of the thumb and positioned on the inner surface of the palm side, the transverse portion of the seal being approximately at the same level as the thumb crotch, an arcuate heat seat at the crotch between the palm adjacent side of the thumb and the finger portion and positioned on the inner surface of the palm side, and a back portion joined to the palm side by a heat seal extending at least along one side and across the finger tip portion and positioned on the inner surface of the completed hand covering.

3. The method of making an electronically heat sealed hand covering of thermoplastic material the finished hand covering having a thumb, thumb crotch and fingertip end, which method comprises providing an outer thumb and front wrist portion, providing an inner thumb and front finger portion, placing the outer surfaces of said portions in juxtaposition with greater fullness in the outer thumb portion, heat sealing said portions together, thus forming a substantially continuous heat sealed seam extending along the sides and across the top of the thumb and across the palm of the hand covering the transverse portion of the seal being approximately at the same level as the thumb crotch, thereby forming a front side assembly for the hand covering, placing the front side assembly of the hand covering into juxtaposition with the rear side, and heat sealing at least one of the sides and the fingertip end thereby forming a hand covering assembly.

4. A hand covering made according to the method of claim 3.

5. The method of making an electronically heat sealed hand covering according to claim 3 in which the sealed assembly is thereafter reversed to provide a hand covering with inside heat seals.

6. The method of making an electronically heat sealed hand covering of thermoplastic material which comprises providing an outer thumb and front wrist portion, providing an inner thumb and front finger portion, placing the outer surfaces in juxtaposition with greater fullness in the outer thumb portion, heat sealing said portions together, thereby forming a heat sealed seam extending along the sides and across the top of the thumb and across the palm of the hand covering thereby forming a front side assembly of the hand covering, heat sealing a plait across the area between the base of the inner side of the thumb and the front finger portion, placing the front side assembly of the hand covering into juxtaposition with the rear side, heat sealing the sides and fingertip end thereby forming a hand covering assembly, and thereafter reversing the hand covering assembly.

7. The method of making an electronically heat sealed hand covering of thermoplastic material which comprises providing an outer thumb and front wrist portion, providing an inner thumb and front finger portion, placing the outer surfaces in juxtaposition with greater fullness in the outer thumb portion, heat sealing said portions together, thereby forming a heat sealed seam extending along the sides and across the top of the thumb and across the palm of the hand covering thereby forming a front side assembly of the hand covering, reversing the formed thumb, heat sealing an arcuate plait across the area between the base of the inner side of the thumb and the front finger portion, reversing the formed thumb to its original position, placing the front side assembly of the hand covering into juxtaposition with the rear side, heat sealing the sides and fingertip end thereby forming a hand covering assembly, and thereafter reversing the hand covering assembly.

References Cited in the file of this patent
UNITED STATES PATENTS 2,900,642    Bauer ------------------ Aug. 25, 1959